Dec. 20, 1966  A. CANTARUTTI  3,293,101
TIRE FABRIC TRANSFER MECHANISM
Filed April 29, 1963  7 Sheets-Sheet 1

FIG_1

INVENTOR.
ARMINDO CANTARUTTI
BY
Oberlin, Maky & Donnelly
ATTORNEYS

Dec. 20, 1966  A. CANTARUTTI  3,293,101
TIRE FABRIC TRANSFER MECHANISM
Filed April 29, 1963  7 Sheets-Sheet 3

INVENTOR.
ARMINDO CANTARUTTI
BY
Oberlin, Maky & Donnelly
ATTORNEYS

Dec. 20, 1966 A. CANTARUTTI 3,293,101
TIRE FABRIC TRANSFER MECHANISM
Filed April 29, 1963 7 Sheets-Sheet 5

INVENTOR.
ARMINDO CANTARUTTI
BY
Oberlin, Maky & Donnelly
ATTORNEYS

Dec. 20, 1966  A. CANTARUTTI  3,293,101
TIRE FABRIC TRANSFER MECHANISM
Filed April 29, 1963  7 Sheets-Sheet 6

FIG_13

FIG_12

INVENTOR.
ARMINDO CANTARUTTI
BY
Oberlin, Maky & Donnelly
ATTORNEYS

United States Patent Office 3,293,101
Patented Dec. 20, 1966

3,293,101
TIRE FABRIC TRANSFER MECHANISM
Armindo Cantarutti, Cuyahoga Falls, Ohio, assignor to NRM Corporation, a corporation of Ohio
Filed Apr. 29, 1963, Ser. No. 276,604
30 Claims. (Cl. 156—361)

This invention relates generally as indicated to a tire fabric transfer mechanism and more particularly to a fabric transfer stand which may be employed to feed tire fabric materials either directly to a tire building machine servicer or to a conveyor for subsequent delivery to a selected servicer.

In tire building apparatus such as that illustrated in the copending application of Edwin E. Mallory and Armindo Cantarutti, Serial No. 162,720, filed December 27, 1961, now Patent No. 3,216,879, a long conveyor system is employed to feed tire fabric materials from a bias cutter to a selected one of a plurality of servicers for tire building machines. Such conveyor system enables a single operator to program and feed the proper amount and kinds of tire fabrics to the servicers for subsequent use on tire building drum type machines. However, if the conveyor system for any reason should momentarily become inoperative, or if certain special materials should be required within the program, such as those required in certain tubeless tires and which might not be available from the bias cutter, the tire fabric transfer mechanism of the present invention can then be employed either to feed such special materials directly to any one of the servicers in the line or to the conveyor system itself without stretching and distorting the material.

Thus in special programming of the tire building materials for the various tire building drum type machines served by the bias cutter, it may be desirable to interject special materials and the mechanism of the present invention affords a convenient means for feeding to the servicers material not coming directly from the bias cutter and its source of supply. Moreover, the present invention provides a second source of supply for the servicers should such source be unavailable for any reason. Moreover, the mobility of the transfer stand of the present invention permits the tire fabric material thereon to be fed either directly to a selected servicer or to the long conveyor system at any point thereon.

It is accordingly a principal object of the present invention to provide a tire fabric transfer mechanism enabling tire fabric material to be fed directly to a selected servicer or the conveyor system supplying such servicers without stock distortion.

A further principal object is the provision of a highly mobile tire fabric transfer stand which will properly pay off the tire fabric therein either to a servicer or conveyor without stock distortion.

A further object is the provision of a tire fabric transfer stand which can drive the servicer into which the tire fabric is loaded.

Yet another object is the provision of a tire fabric transfer stand which will properly center the tire fabric being payed therefrom and provide the distortion free characteristics of the stock required.

Still another object is the provision of a highly mobile tire fabric transfer stand which can be used in conjunction with tire building apparatus as that disclosed in the aforementioned copending application of Edwin E. Mallory and Armindo Cantarutti, Serial No. 162,720, filed December 27, 1961, now Patent No. 3,216,879.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
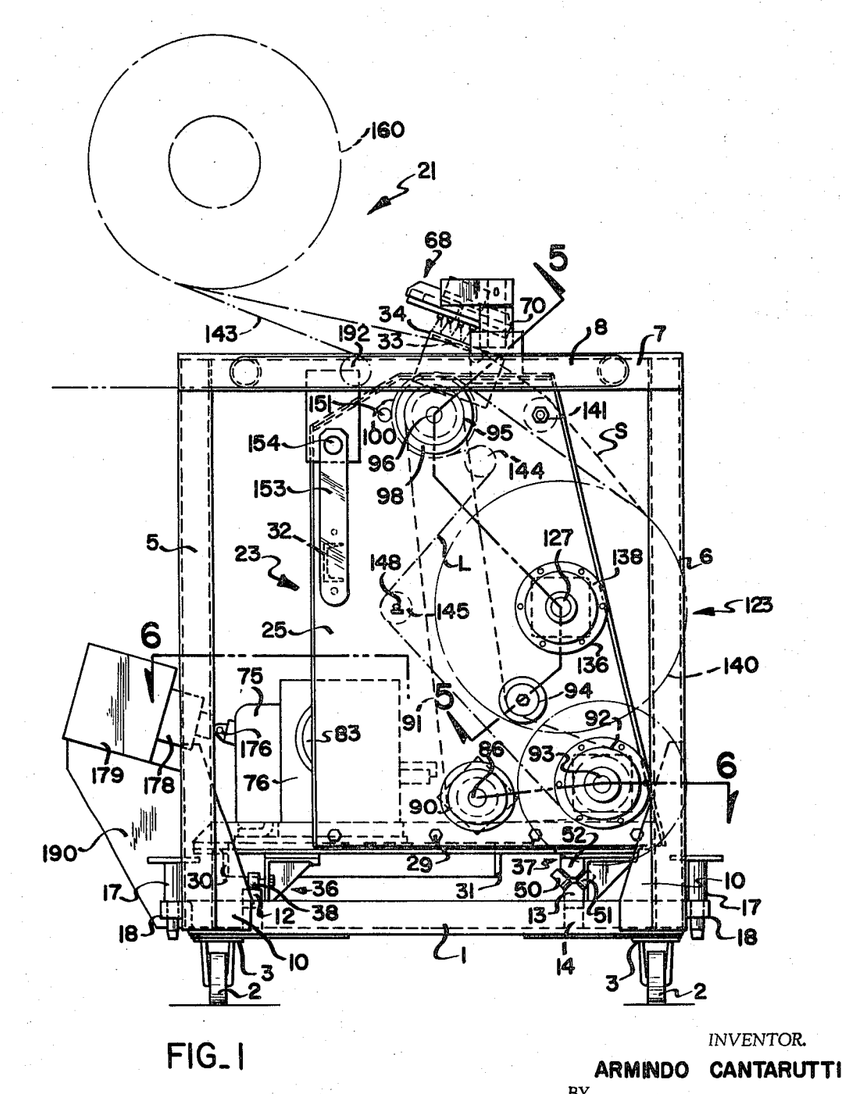
FIG. 1 is a side elevation of one embodiment of the present invention illustrating the same in position to feed tire fabric into a tire servicer.
Figure 2:
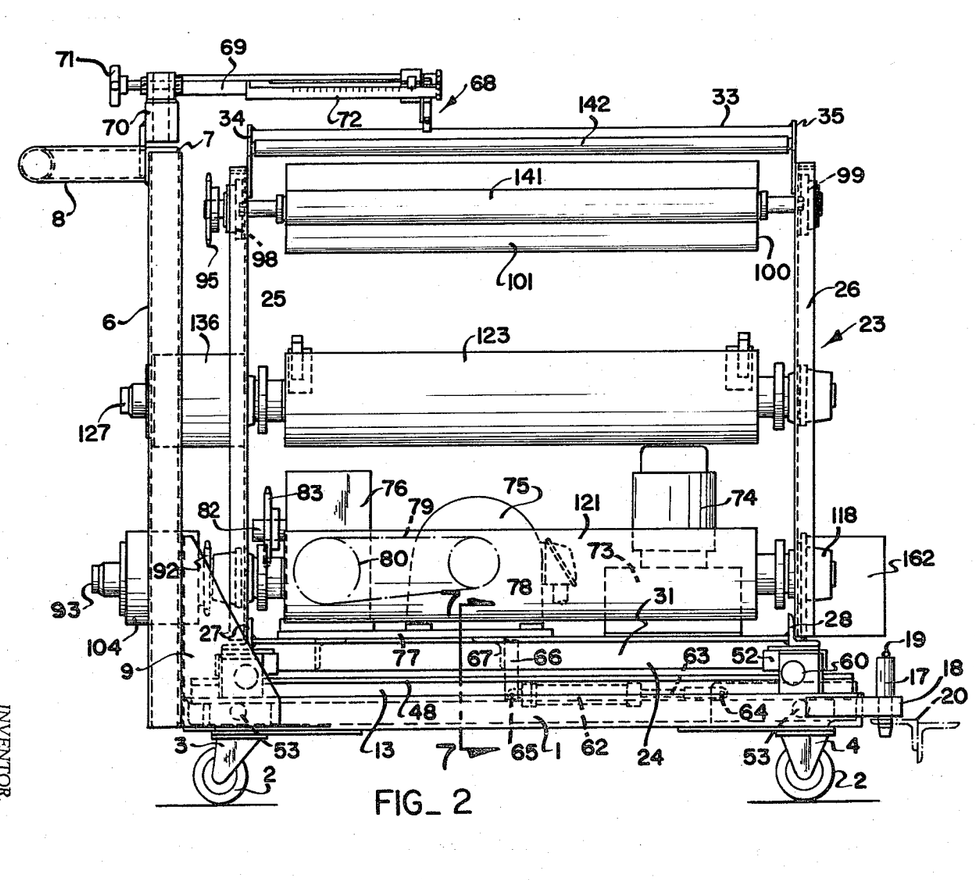
FIG. 2 is a front elevation of the embodiment of the invention illustrated in FIG. 1 as seen from the right thereof.

Referring now to the annexed drawings and more particularly to the embodiment illustrated in FIGS. 1 and 2, it will be seen that the mechanism comprises a base sub-assembly comprised of an angle iron frame 1 supported on rollers 2 at each corner thereof. The rollers 2 nearest the viewer in FIG. 1 or at the left hand side of FIG. 2 may be mounted on casters 3 while those at the opposite end of the frame 1 or at the right hand side in FIG. 2 may be fixedly mounted to the underside of the frame by brackets 4. This, of course, facilitates the easy steerability of the mechanism. At one end, two tubular uprights 5 and 6 are provided secured to the corners of the frame 1 and such uprights are interconnected at the top by horizontal member 7. A tubular U-shaped handle 8 projects from the horizontal member 7 to facilitate the convenient pushing or pulling of the mechanism with steerable mobility being provided by the rollers 2 and the casters 3. Gusset plates 9 and 10 may be provided to strengthen and rigidify the uprights 5 and 6 with respect to the base frame 1.

Extending longitudinally of the base frame 1 are two rails 12 and 13 which may be supported on blocks 14 in turn supported on the horizontal flange of the angles forming the base 1. The mounting of these parallel rails may be seen more clearly in FIGS. 7, 8 and 9. Suitable fasteners 15 (see FIG. 9) may pass upwardly through the horizontal flange of the base 1, through the blocks 14 and be threaded into the ends of the rails to secure the same to the base 1. The blocks 14 may be secured to the base as by welding.

The base sub-assembly then simply comprises the angle iron frame 1 supported on the rollers 2 at each corner with the horizontally extending rails 12 and 13 extending longitudinally thereacross. At the one end is the upstanding frame comprised of the uprights 5 and 6 with the handle 8 on the top thereof facilitating the pushing or pulling of the mechanism to the desired location. When the mechanism is in position to receive a roll of tire fabric material either from the bias cutter table or from an overhead crane or the like, or when the mechanism is positioned to feed such tire fabric to a tire servicer, as illustrated in FIG. 1, aligning pins 17 at each corner of the frame 1, mounted on brackets 18, may be employed properly to position the mechanism. The tops of the aligning pins may be provided with horizontal bar handles 19 and such may be fitted in location brackets 20, seen in FIG. 2, properly to position the mechanism for feeding the stock into the servicer shown schematically at 21 in FIG. 1.

Mounted on the rails 12 and 13 for movement therealong is a stand 23 which comprises a base or platform 24 and two parallel upstanding side plates 25 and 26. The base 24 may comprise two side angle members 27 and 28 to which the side upstanding plates 25 and 26 are secured as by the fasteners 29 seen in FIG. 1. Longitudinally extending angle members 30 and 31 interconnect the side members 27 and 28 to rigidify the stand structure 23. A channel member 32 interconnects the upstanding side plates 25 and 26 and additionally, at the top of the side plates, an inclined shelf 33 extends between plate extensions 34 and 35 which may be bolted or otherwise suitably secured to the inside faces of the upstanding plates 25 and 26, respectively. It is, of course, between these upstanding sides 25 and 26 that the rolls of tire fabric and liner are journalled for rotation for feeding such fabric stock into the selected spool of the tire servicer 21.

Figure 7:
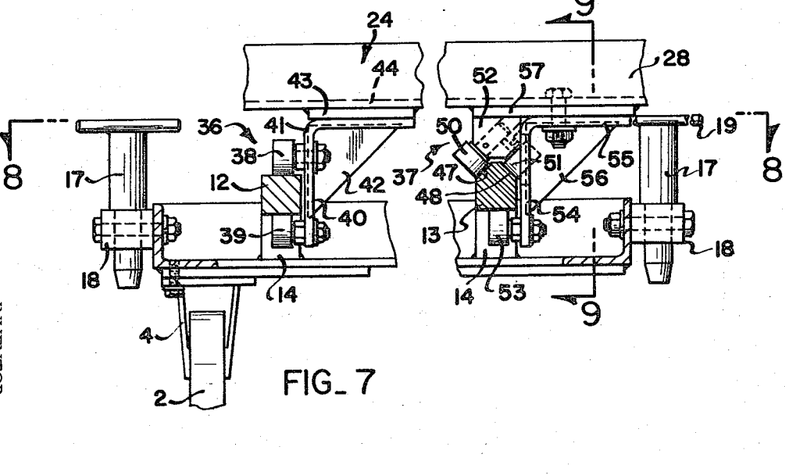
FIG. 7 is an enlarged fragmentary transverse section taken substantially on the line 7—7 of FIG. 2 illustrating the rail mounting of the stand on the base sub-assembly.
Figure 8:
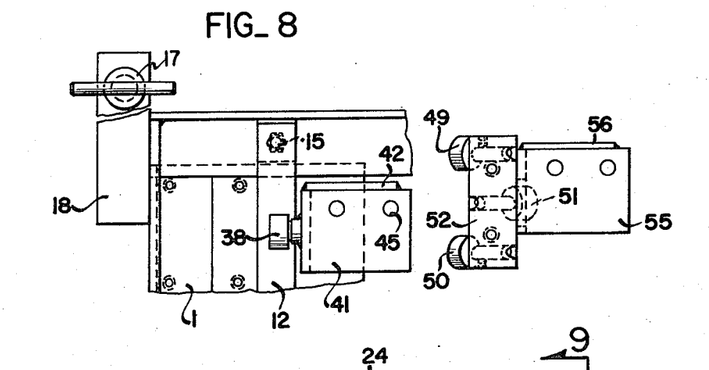
FIG. 8 is a fragmentary horizontal view taken substantially on the line 8—8 of FIG. 7 of such rail mounting.
Figure 9:
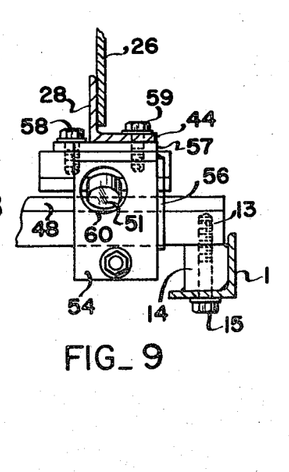
FIG. 9 is a fragmentary vertical section taken substantially on the line 9—9 of FIG. 7.

Referring now additionally to FIGS. 7, 8 and 9, it will be seen that the stand 23 is mounted for movement on the rails 12 and 13 by supporting roller brackets 36 and 37 duplicated beneath the side plates 25 and 26. Accordingly, only those beneath the side plate 26 will be described in detail. The rail 12, which is square in cross-section, accommodates top roller 38 and bottom roller 39 rotatably mounted on the vertically extending flange 40 of angle bracket 41 and a gusset 42 rigidifies the bracket 41. The bracket 41 may be secured through shim or spacer plate 43 to the bottom flange 44 of the angle 28 of the base 24 by suitable fasteners passing through the apertures 45 in the top of the angle bracket 41. The roller bracket 36 thus comprises a top and bottom roller for the rail 12 confined therebetween.

It is apparent that the rail 13 is not of the square cross-section as the rail 12, but includes inclined top lateral surfaces 47 and 48. The surface 47 supports inclined rollers 49 and 50 whereas the surface 48 supports inclined roller 51, all such rollers 49 through 51 being mounted in roller block 52. The rollers 49, 50 and 51 thus straddle the ridge of the rail 13 provided by the inclined surfaces 47 and 48 and thus maintain the stand 23 properly positioned on the rails 12 and 13. A further bottom roller 53 is provided secured to the vertical leg 54 of angle bracket 55. A gusset plate 56 is secured to the edge of the angle to rigidify the same and both the block 52 and the angle may be secured together and beneath a spacer plate 57. The block 52 may be secured to the spacer plate by fasteners 58 and the bracket may be, in turn, secured through the spacer plate to the bottom leg 44 of the angle 28 by fasteners 59. It is noted that the vertical leg 54 of the angle is provided with a circular aperture 60 accommodating the inclined roller 51 therethrough. It will be seen that the roller bracket 37 includes three top rollers 49 through 51 supported on the inclined edges of the rail 13 and a bottom roller 53 confining the rail therebetween. The stand 23 may then accordingly be shifted back and forth along such rails to facilitate tracking of the tire fabric into the tire servicer as will hereinafter be described.

Such movement or tracking of the stand 23 along the rails 12 and 13 is obtained by means of a piston-cylinder assembly 62 seen in FIG. 2, the rod 63 of which is connected at 64 to the base 1. The blind end of the piston-cylinder assembly is connected at 65 to a depending bracket 66 secured to an angle frame 67 which is part of the base 24 of the stand 23 supporting the main drive assembly.

Actuation of the piston-cylinder assembly 62 is obtained by means of a photocell tracking unit 68. Such unit is mounted for longitudinal adjustment on a support arm 69 in turn mounted on pedestal 70 on top of the horizontal 7 of the end upright frame which is part of the base 1 subassembly. Adjustment of the photocell unit 68 may be obtained by a hand wheel 71 to move such unit along a scale 72. Such scale may be graduated from 32 to 14, such being the maximum and minimum stock widths which may be handled on the transfer stand of the FIGS. 1 and 2 embodiment. As seen more clearly in FIG. 1, such photocell unit may include two light and photocell units which utilize the reflective nature of the shelf 33 and such may be slightly laterally spaced to maintain the edge of the stock therebetween and in the desired predetermined position with respect to the servicer as such stock is fed therein. Hydraulic power for the piston-cylinder assembly 62 may be obtained from a two gallon power pack unit 73 with the drive 74 thereof being controlled directly by the photocell unit 68. The power pack unit and its drive may be mounted on the base 24 of the stand 23 at the rear thereof or to the left as seen in FIG. 1.

Adjacent the power pack unit 73 there is provided a drive motor 75 which may be a 3 phase 1800 r.p.m. type motor, driving a worm gear speed reducer 76. This motor drive unit 75, 76 is mounted on a plate 77 which in turn supported by the angle frame 67 within the base 24. A 24 tooth pulley 78 on the output shaft of the motor 75 may be employed to drive a timing belt 79 which is also trained about a 30 tooth pulley 80 driving the speed reducer 76. This drive may be seen more clearly in FIG. 6.

Figure 5:
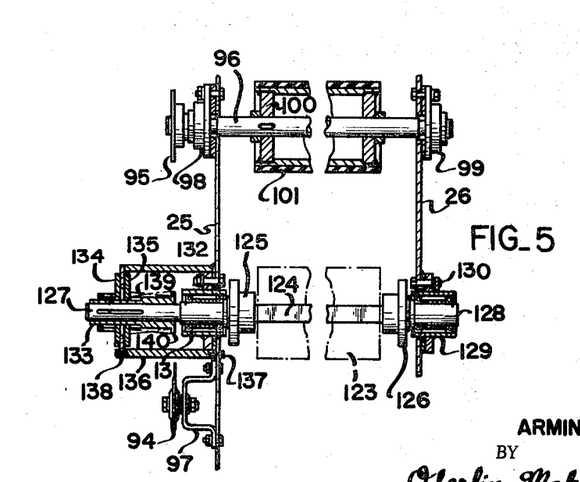
FIG. 5 is a fragmentary vertical section taken substantially on the line 5—5 of FIG. 1.
Figure 6:
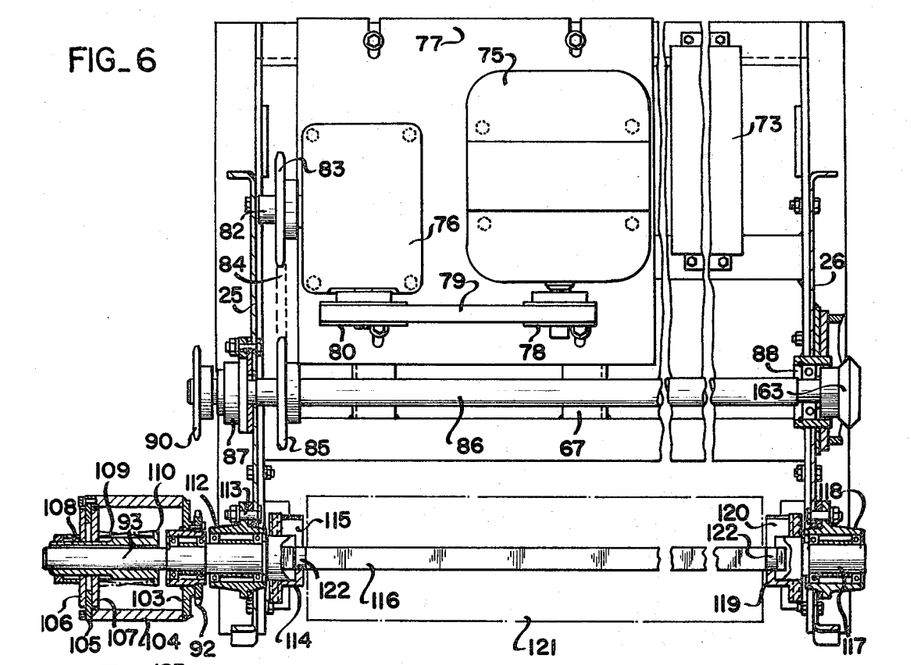
FIG. 6 is a somewhat enlarged fragmentary horizontal section taken substantially on the line 6—6 of FIG. 1 illustrating the motor drive sub-assembly.

Referring now additionally to such FIG. 6, it will be seen that the output shaft 82 of the speed reducer 76 has a sprocket 83 mounted thereon which drives, by means of chain 84, sprocket 85 mounted on shaft 86. Such shaft 86 extends between the side plates 25 and 26 of the stand 23 and is journalled therein by means of bearings 87 and 88, respectively. The sprockets 83 and 85 may have the same number of teeth so that the shaft 86 will be driven at the same speed as the output shaft of the speed reducer 76. Mounted on the outboard side of the shaft 86 is a further sprocket 90 which may be smaller than the sprocket 85 but which has a larger number of teeth. About such sprocket is trained a chain 91 seen in FIG. 1 which is also trained about sprocket 92 on shaft 93, about take-up sprocket 94 and finally about sprocket 95 mounted on shaft 96 at the top of the stand. The chain 91 may, for example, be an A.S.A. Standard single strand roller chain approximately 91¼ inches long. The sprockets 92 and 95 may be of the same size as the sprocket 85 driving such chain. Accordingly, the shafts 93 and 96 will turn at the same speed. As seen in FIG. 5, the take-up sprocket 94 is adjustably mounted on the outside of the plate 25 on U-shape bracket 97. The shaft 96, like the shaft 86, extends completely between the plates 25 and 26 and is journalled at each end by means of bearings 98 and 99. A roll 100 is keyed to the shaft 96 and is provided with a rubber covering 101.

As seen in more detail in FIG. 6, the sprocket 92 is secured to a hub 103 which is journalled on shaft 93, such hub forming the inner end of a cylindrical housing 104 having an annular outer end plate 105 gripped between plates 106 and 107 keyed to hub 108 which is in turn keyed to the shaft 93. The compression spring 109 surrounding the hub 108 extends between the plate 107 and the flange 110 on the inner end of the hub. This spring then presses the plate 107 against the annular plate 105 driven by the sprocket 92 and the mechanism thus illustrated acts as a slip clutch between the sprocket 92 and the shaft 93.

The shaft 93 is also journalled in hub 112 secured to the side plate 25 by suitable fasteners such as the nut and bolt assemblies shown at 113. The inner end of the shaft 93 is enclosed by a socket receptacle 114 releasably to receive through Y-shape slot 115 therein one end of a square liner roll shaft 116.

Axially aligned with the shaft 93 is a stub shaft 117 journalled in hub 118 secured to the side plate 26 in the same manner as the hub 112 is secured to the side plate 25. The inner end of the stub shaft 117 is enclosed by a fixed slotted receptacle 119 also provided with a Y-shape slot 120 to receive the oppposite end of the square liner roll shaft 116 in the same manner as the receptacle 114. The liner roll 121 is then supported for rotation by the receptacles 114 and 119 enclosing the inner ends of shafts 93 and 117, respectively, and is driven for rotation by means of the chain 91 trained about the sprocket 92 through the slip clutch illustrated in section in FIG. 6. Round portions 122 near the ends of the square shaft 116 fit in the bottoms of the slots 115 and 120 and the square ends therebeyond having driving engagement with the inner ends of shafts 93 and 117.

Referring again to FIG. 5, it will be seen that a stock roll 123 has its square shaft 124 similarly received in receptacles 125 and 126 enclosing the inner ends of shafts 127 and 128, respectively. The stub shaft 128 is journalled in hub 129 which is secured by suitable fasteners 130 to the side plate 26. The shaft 127 is also journalled in a hub 131 secured by fasteners 132 to the side plate 25. However, such shaft 127 extends beyond the hub and through a hub 133 keyed to the projecting end of the shaft which has two spaced plates 134 and 135 keyed thereto. A cylindrical housing 136 surrounding the shaft 127 is provided secured to the plate 25 by suitable fasteners 137 and an annular plate 138 on the end thereof is interposed between the plates 134 and 135. A compression spring 139 surrounds the hub 133 and extends between end flange 140 and the inner plate 135 pressing the same against the plate 138. This mechanism which is quite similar to the slip clutch illustrated in FIG. 6 acts as a drag brake for the shaft 127 and, of course, the stock roll 123 carried by the shafts 127 and 128. The stock roll 123 and the shafts supporting the same are not driven by the drive unit.

It will here be understood that the ply stock or tire fabric is of a relatively flimsy nature and is extremely tacky. Such makes the fabric extremely difficult to handle and it is stored in rolls including a liner interposed between the convolutions of the fabric. A roll of such tire fabric and liner is then wound upon the stock roll 123 and when the roll is full, such will be placed within the stock roll shaft receptacles 125 and 126. A full roll of such liner and stock will achieve the diameter indicated in phantom lines in FIG. 1 at 140. The full stock roll may be supported by special slings and lowered from an overhead crane into the transfer mechanism of the present invention to be properly seated in the receptacles 125 and 126. The tire fabric or stock S will then be manually threaded over the top of roll 141, over roller 142 and the shelf 33 onto the apron or extended liner 143 of a servicer station. Reference may be had to the copending application of Edwin E. Mallory and Armindo Cantarutti, Serial No. 162,762, filed December 27, 1961, for "Tire Building Apparatus," now Patent No. 3,230,132 for a more clear disclosure of the servicer and the extensible apron formed by the liner of the servicer station when it is desired to feed the tire fabric material therein.

Figures 3, 4:
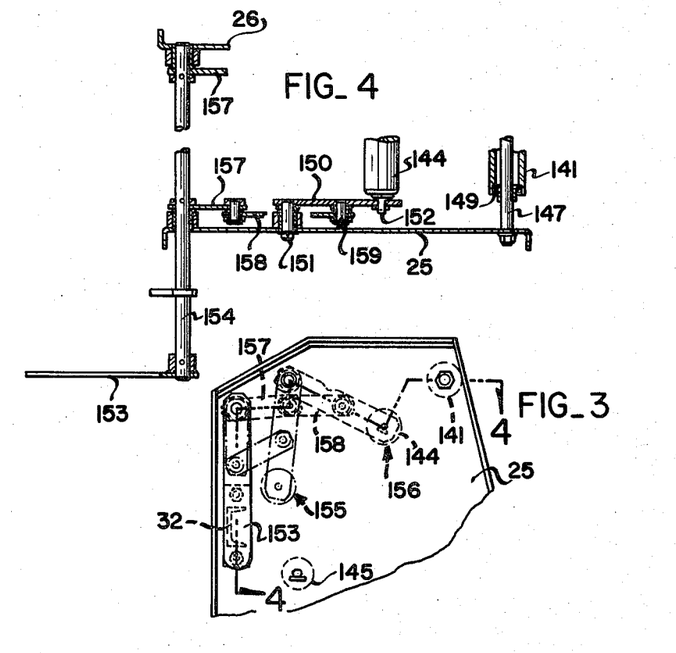
FIG. 3 is a fragmentary side elevation illustrating the idler roll sub-assembly and the operating linkage by which the idler roll is moved and showing in phantom lines its alternate position.
FIG. 4 is a fragmentary section taken substantially on the line 4—4 of FIG. 3.

The liner L from the stock roll is also manually threaded beneath the roller 141 and about the rubber covered roller 96. From the rubber covered roller, the liner extends about a movable idler roller 144, about a fixed roller 145 and finally about the liner roll 121 which is removably received in the receptacles 114 and 119, as seen more clearly in FIG. 6. The rollers 141 and 145, which may be substantially identical in form, are mounted on shafts 147 and 148 extending between the side plates 25 and 26 and such rollers are journalled for rotational movement on such shafts as seen more clearly at 149 in FIG. 4.

In order to facilitate the manual threading of the liner as above indicated, the idler roll 144 is mounted for movement on the distal ends of a pair of arms 150, which are proximally pivoted at 151 to the side plates 25 and 26. Reference may be had to the detailed views of FIGS. 3 and 4. The idler roll 144 is mounted on a shaft 152 and may be journalled thereon in the same manner as the roll 141 is journalled on the shaft 147. A handle 153 pinned to the end of shaft 154 which extends between the side plates 25 and 26 is employed to swing the arms 150 and thus the idler roll 144 about the axis of the proximal pivot pins 151 to move the same from the threading position indicated at 155 in phantom lines in FIG. 3 to the drive position indicated at 156 in FIG. 3. This movement is obtained by means of an elbow linkage which includes a first link 157 pinned to shaft 154 for movement therewith with the outer end of such link being pivotally connected to a second link 158 which is in turn pivotally connected to the approximate middle of the arm 150 as indicated at 159. When the handle 153 extends vertically downwardly, the link 157, which extends substantially normal to the handle, will cause the arms 150 to pivot to their extended position properly positioning the roll 144 in its drive position adjacent the rubber covered roll 101. When the handle 153 is swung to the rear to a substantially horizontal position, the link 157 will be pivoted to a vertical position and the link 158 will then pivot the arms 150 causing the roll 144 to assume its threading position 155. In such position, the operator can then readily manually thread the liner from the rubber covered drive roll 100 about the fixed roller 145 and then secure the same to the liner take-up roll 121. When the liner has thus been properly threaded, the operator will then pivot the handle 153 to its vertically extending position causing the idler roller 144 to move to its drive position 156 causing the liner to wrap substantially about the rubber covered drive roller 100. The pivots for the links 157 and 158 are so arranged to provide a toggle lock to preclude the tension in the liner L from moving the roll 144 from its drive position 156.

It will, of course, be apparent that the liner L must be removed from the stock roll 123 at the same rate as the stock or fabric is removed therefrom. Since the stock roll 123 is not positively driven but merely retarded by the drag brake unit shown more clearly in FIG. 5 to maintain proper liner tension, it will then be seen that the drive for the liner L must be synchronized with the drive for the stock S. Since the stock S is being wrapped between convolutions of the liner 143 in the storage drum 160 of the servicer 21, the drive for the drum 160 should then be synchronized with the drive for the rubber covered drive roll 100 which pays the liner from the stock roll 123. Moreover, a power source for the drive of the spool 160 may well be required. To obtain a synchronizing drive between the storage drum 160 and the drive roll 100 for the liner L, there is provided the power take-off unit shown more clearly in FIGS. 10 and 11. The shaft 86, which is journalled in bearing 88 in the plate 26 projects therethrough into a miter gear box 162 secured to the outside of the plate 26. The projecting end of the shaft 86 is provided with a miter gear 163 keyed thereto which is in mesh with a miter gear 164 mounted on shaft 165, the axis of which intersects the axis of shaft 86. Such shaft is journalled in the side walls of the box 162 as illustrated at 166 and 167. A removable access plate 168 closes the end of the miter gear box 162. The projecting end of the shaft 165 is connected by means of a universal joint 169 to one end of extensible drive shaft 170. Such shaft comprises two sections 171 and 172 with the section 171 including a projection 173 projecting within the tubular end of the portion 172. A cross pin 174 is employed to secure the two sections together and such cross pin is mounted in elongated slots 175 in the end of portion 172. Accordingly, the portions 171 and 172 of the shaft 170 may move with respect to each other a distance limited by the extent of the slots 175.

The opposite end of the shaft 170 is connected by means of a universal joint 176 to a stub shaft 177 mounted for rotational movement in hub 178 projecting from a miter gear box unit 179. The miter gear 180 is keyed to the inwardly projecting end of the shaft 177. An internally splined shaft 181 extends normal to the axis of shaft 177 and is journalled at 182 and 183 in the walls of the miter gear box 179. A miter gear 184 is keyed to the shaft 181 and is in mesh with the miter gear 180. It will now be seen that the rotational movement of the shaft 86, driven directly from the output shaft 82 of the speed reducer 76, is then imparted to the internally splined shaft 181 in the miter gear box 179. The internally splined shaft 181 may be coupled to the projecting externally splined end of shaft 185 on the servicer 21. Such shaft which may be journalled in hub 186 drives a toothed timing belt sheave 187 which in turn will drive the rubber covered roll of the servicer which determines the speed of the liner 143 and the speed such liner is being wrapped around the storage drum 160. The liner 143 is thus wrapped at the proper synchronized speed because the rubber covered roll is the same diameter as the roll 100. (Reference again may be had to copending application Ser. No. 162,720.) The universal joints and the extensible nature of the shaft 170 permit the relative movement of the stand 23 with respect to the stationary servicer 21 for the centering of the plies of fabric material on the liner 143 of the particular storage station in the servicer. When the tire transfer mechanism is being trundled to the desired discharge points, the miter gear box 179 may be supported on a special upstanding bracket 190 extending upwardly from the base 1. (See FIG. 1.)

In operation, the stand of the FIG. 1 embodiment will be trundled to a loading position wherein a roll of stock and liner will be mounted in the receptacles 125 and 126, the loaded stock roll will then be trundled to the proper discharge point with the operator simply pushing the transfer stand by means of the handle 8. It will, of course, be understood that the wheeled vehicle may be motorized if desired. When the stand is properly positioned to feed the tire fabric material into a selected storage drum of a tire servicer, the aligning pins 17 will be inserted in the fixed brackets 20 properly to hold the base 1 in the desired position.

Figure 10:
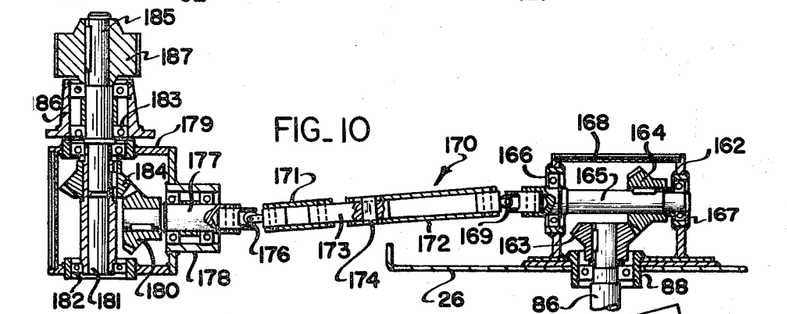
FIG. 10 is a fragmentary longitudinal section taken through the servicer drive assembly.
Figure 11:
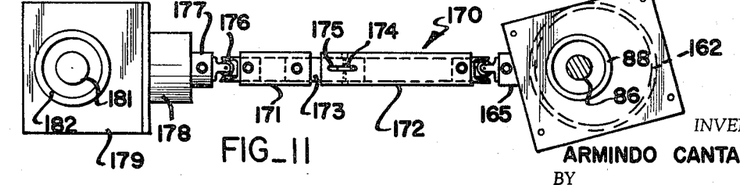
FIG. 11 is an elevational view of such servicer drive assembly.

It will be understood that the roll 192 about which the liner 143 is trained on the servicer storage unit to be loaded will be extended forming the apron or shelf onto which the tire fabric will be placed to be fed into the drum 160 between convolutions of the liner. The operator now places an empty liner reel or spool 121 in the receptacles 114 and 119 and by operation of the handle 153, the idler roll 144 may be moved to its threading position 155 indicated in FIG. 3. The operator then threads the stock or fabric S over the fixed roller 141 and over the roller 142 onto the shelf 33 and into proper position on the shelf provided by the servicer liner 143. The centering and control unit 68 will be adjusted at this time by means of the hand wheel 71 to the proper stock width. The liner L is simultaneously threaded beneath the roller 141 and about the rubber covered drive roll 100, then about the fixed roller 145 and finally is attached to the empty liner roll 121. By moving the handle 153 to its vertical position, the roll 144 is moved to its drive position causing the liner to wrap about the drive roll 100. It is again noted that the position of the pivots of the links 157 and 158 affords a toggle action locking the roll 144 in its drive position 156 (see FIG. 3). The power take-off shown in FIGS. 10 and 11 is now connected to the shaft 185 of the servicer. The mechanism may be connected to a suitable electrical outlet and is now ready to commence feeding of the tire fabric into the storage drum 160. The operator may manually control the mechanism initially to make sure that proper feeding is being obtained and thereafter the unit will operate automatically. The motor 75 driving the speed reducer 76 in turn drives the shaft 86 which drives both the chain 91 through sprockets 90 and the power take-off unit through miter gear 163. The chain 91 drives the rubber covered drive roll 100 and also the empty or substantially empty liner roll 121. The drag brake unit in housing 137 will maintain proper tension of the liner between the stock roll 123 and the drive roll 100. The empty liner roll 121, as well as the empty stock roll 123, will preferably be 7 inches in diameter whereas the rubber covered drive roll 100 will be approximately 6¾ inches in diameter. Thus proper tension in the liner is obtained between the empty liner roll and the drive roll with the slip clutch shown in FIG. 6 permitting this drive differential. It will, of course, be understood that as the liner is wrapped upon the roll 121, the effective diameter thereof becomes greater and greater thus more slippage will occur. The unit 68 will, of course, operate to maintain the edge of the fabric S at a fixed point with respect to the storage drum 160 by actuating the piston-cylinder assembly 62 to shift the stand 23 back and forth on the rails 12 and 13. When the stock roll is empty and the liner roll full, the transfer stand may be maintained in position and reloaded from an overhead monorail hoist which carries material from the storage center to the servicer. Accordingly, the transfer stand need not be moved.

Figure 12:
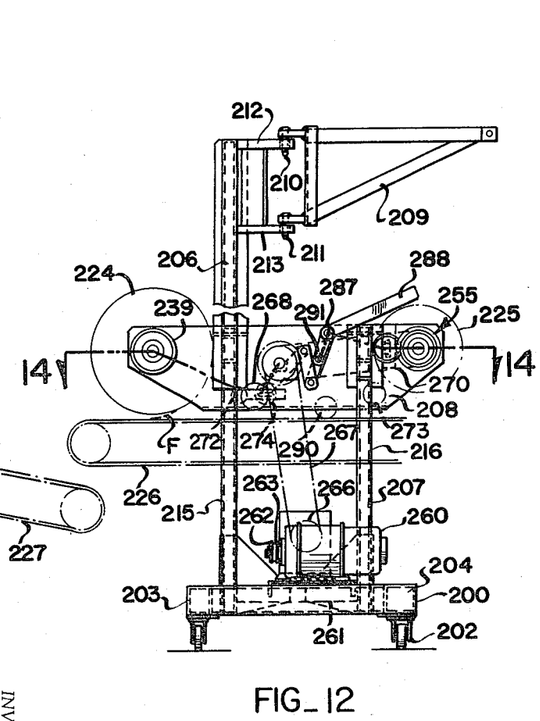
FIG. 12 is a side elevation of a further embodiment of the present invention particularly adapted to place tire fabric on a conveyor.
Figure 13:
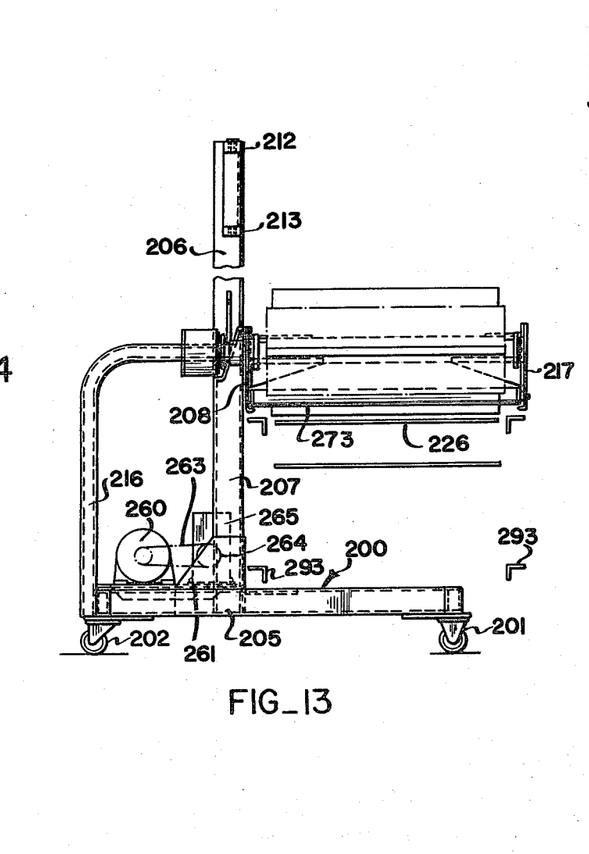
FIG. 13 is a front elevation of the FIG. 12 embodiment as seen from the right thereof.
Figure 14:
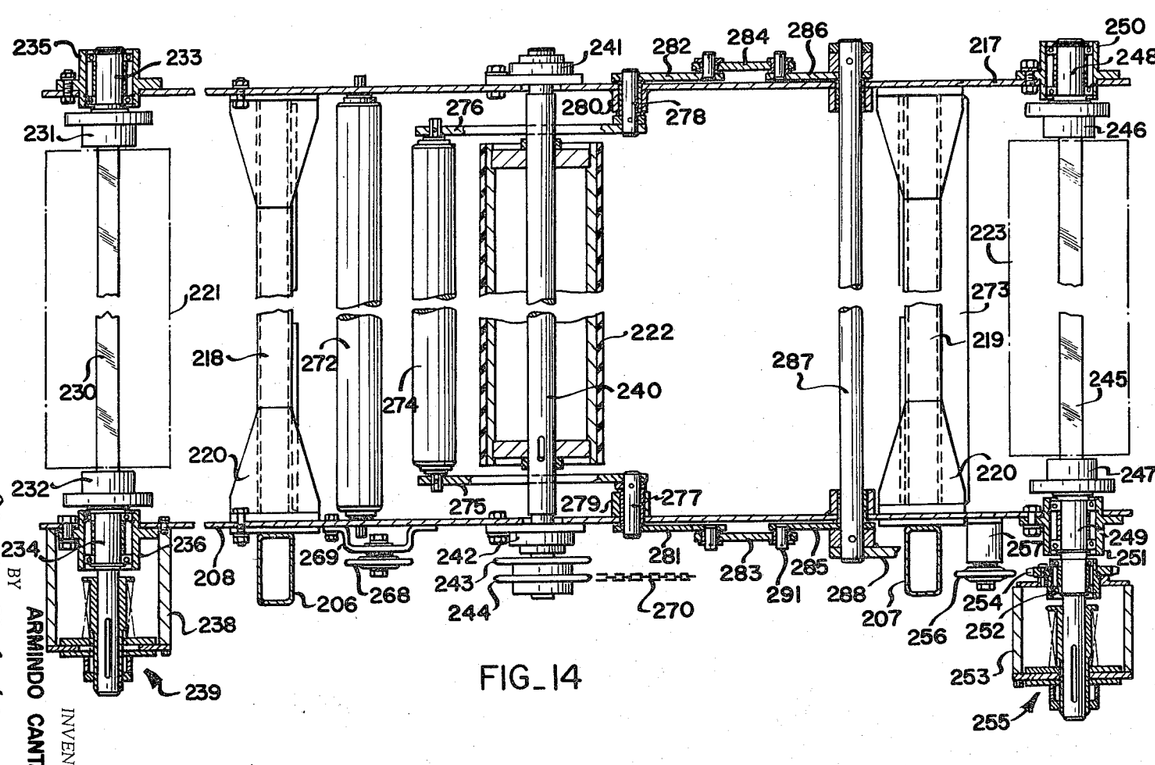
FIG. 14 is an enlarged horizontal section taken substantially on the line 14—14 of FIG. 12.

EMBODIMENT OF FIGS. 12, 13 and 14

In supplying tire fabric to a line of tire servicers, a conveyor system is employed which comprises a system of conveyors including loading conveyors for each of the servicers in the line. Should for some reason the conveyor system become inoperative, it may be desirable to by-pass the inoperative portion of the system to continue to feed tire fabric to a selected one of the servicers. Moreover, in the programming of tire fabric for the building of tire carcasses, special fabrics may require to be inserted in the program which are not available from the bias cutter. Accordingly, with the embodiment illustrated in FIGS. 12 through 14, tire fabric may be fed to the conveyor system at substantially any point therealong.

The transfer stand of this embodiment comprises a base 200 which may be composed of tubular structural members and such are of general rectangular shape. The base may be supported on fixed wheels 201 at one end thereof and caster or swivelably mounted wheels 202 at the opposite end thereof to facilitate steerable mobility. Near the middle of the base 200 extending between the two side members 203 and 204 of the base is a transverse tubular frame 205 which supports two upstanding tubular columns 206 and 207. (See FIG. 14.) These columns may be of rectangular tubular sectional configuration and support one side plate 208 of the stand. The column 206 may extend beyond the side plate 208 and a horizontally swingable triangular boom 209 may be pivoted at 210 and 211 to arms 212 and 213, respectively, which horizontally project from the upward extension of the column 206. Such boom may be employed as an overhead crane to facilitate the loading and unloading of the reels of tire fabric in the transfer stand. Tubular strut members 215 and 216 extend upwardly from one end of the base 200 and are bent horizontally to join the columns 206 and 207, respectively, fairly close to the top of the side plate 208. The strut members 215 and 216 will serve as pushing or pulling handles to facilitate the convenient trundling of the stand at the desired loading and unloading positions.

A plate 217 opposed to the plate 208 is supported therefrom by two horizontally extending tubular structural members 218 and 219 and gusset plates 220 may be employed to rigidify the stand structure formed by the side plates 208 and 217 properly spacing the same. As in the FIG. 1 embodiment, supported between the side plates 208 and 217 are the shell 221 of the stock roll, the rubber covered drive roll 222 and the shell 223 of the liner take-up roll. The stock roll 221 when full will achieve the diameter indicated at 224 in FIG. 12 whereas the liner roll when full will only achieve the diameter indicated at 225 in such FIG. 12. The stock roll, of course, when full comprises alternating coiled layers of fabric material and liner with the object being to place the fabric on the conveyor 226 and to take-up the liner on roll 223. The fabric material will then be deposited from conveyor 226 onto a servicer loading conveyor 227 to be fed into its servicer or will pass subsequently to a further servicer in the line.

The stock roll shaft 230 is removably supported in receptacles 231 and 232 on the inner ends of shafts 233 and 234 journalled in hubs 235 and 236 mounted on the plates 217 and 208, respectively. The shaft 234 extends through a drag brake housing 238. A spring loaded drag brake unit 239 is thus provided which may be identical in form to the drag brake unit for the stock roll illustrated in FIG. 5.

The shaft 240 for the drive roll 222 is journalled at 241 and 242 to plates 217 and 208, respectively, and such shaft projects through the journal 242 and has affixed to the projecting end thereof two drive sprockets 243 and 244. Shaft 245 of the liner roll 223 is removably secured in receptacles 246 and 247 mounted on the inner ends of shafts 248 and 249 journalled in hubs 250 and 251 secured to the plates 217 and 208, respectively. The shaft 249 extends beyond the hub 251 and is journalled in hub 252 of slip clutch housing 253 and a sprocket 254 is secured to the housing and such shaft 249 extends through the slip clutch unit 255 thereon which may be identical in form to the slip clutch of the FIG. 1 embodiment illustrated in FIG. 6 for the liner roll 121.

The sprocket 254 is in the same plane as sprocket 244 keyed to the outer end of the drive roll shaft 240. In such plane is a take-up sprocket 256 vertically adjustably mounted on bracket 257. Rotation of shaft 240 is afforded by means of drive motor 260 mounted on platform 261 on the opposite side of the columns 206 and 207 from the plates 208 and 217. The drive shaft of motor 260 is provided with a toothed pulley 262 driving timing belt 263 trained about toothed pulley 264 on input shaft of speed reducer unit 265. The output shaft of such unit is provided with sprocket 266 driving chain 267 trained about sprocket 243. A take-up sprocket 268 is horizontally adjustable on bracket 269 and engages chain 267 properly to tension the same.

The vertical adjustment of the take-up sprocket 256 accomplishes the same tensioning purpose for the drive chain 270 trained about the sprockets 244 and 254. A drive from the motor 260 through the speed reducer unit 265 is then imparted directly to the shaft 240 of the drive roll 222 by means of the chain 267 and to the liner roll 223 by means of chain 270. It is noted that the column 207 may be provided with apertures accommodating the chain 270 for movement therethrough.

Also extending between the plates 208 and 217 are rollers 272 and 273 mounted on fixed shafts secured to such plates. These rollers may be substantially identical in form to the rollers 141 and 145 of the FIG. 1 embodiment. A threading roll 274 is mounted at the distal ends of arms 275 and 276 which are proximally pivoted by means of pins 277 and 278 journalled in aligned bushings in hubs 279 and 280 mounted on the insides of the plates 208 and 217, respectively. The arms 275 and 276 are secured to such pins for rotation therewith. Arms 281 and 282 are also fixed to the pins 277 and 278, respectively, externally of the plates 208 and 217. The arms 275, 281, and 276, 282 then comprise bell-crank levers supporting the roller 274 for movement about the aligned axes of pins 277 and 278. The distal ends of the arms 281 and 282 are pivoted to links 283 and 284, respectively, with such links also being pivotally connected to arms 285 and 286 which are secured to operating shaft 287 extending between the plates 208 and 217. An operating handle 288 is secured to the outer end of the shaft 287 exteriorly of plate 208.

Referring now to FIG. 12, it will be seen that as the arm 288 is swung about the axis of shaft 287 in a clockwise direction to the full line position indicated in such figure, the roll 274 will move to its drive position beneath the drive roll 222. However, if the arm 288 is pivoted in a counterclockwise direction, the threading roll 274 will move to its threading position indicated in phantom lines at 290 in FIG. 12.

The center pivot 291 between the arm 285 and the link 283 will move slightly over center in the full line position shown in FIG. 12 providing a toggle action maintaining the threading roll 274 in its threading position so that the tension of the liner will not move the same from such position.

It is noted that the rolls supported between the plates 208 and 217 are thus cantilevered from the supporting columns 206 and 207. Moreover, the base 200 is sufficiently low that it will move beneath frame members 293 of the conveyor 226 permitting the rollers to be positioned normal to the path of the conveyor directly thereover.

In operation, a full roll of tire fabric having a liner interposed between the convolutions thereof will be mounted in the receptacles 231 and 232 and the transfer stand may then be trundled into the desired position along a particular conveyor 226 in the conveyor system feeding the tire servicers. The operators may employ the boom 209 to load the stand. With the stand in the proper position for unloading, aligning pins may be employed to hold the stand in the proper position as in the FIG. 1 embodiment and the operator will now place an empty liner shell 223 in the receptacles 246 and 247. Although not illustrated, it will be understood that a synchronizing drive, similar to that shown in FIGS. 10 and 11, may be provided between the speed reducer unit 265 and the drive for the conveyor 226. Similarly, the drive for the conveyor or servicer may be employed to drive the rolls of the stand of the present invention. In any event, the operator will pivot the handle 288 in a counterclockwise direction to move the threading roll 274 to its threading position shown at 290. The operator may then manually pay off the liner and fabric from the stock roll 221 with the fabric F simply dropping onto the top flight of the conveyor 226 and being pulled therealong. The frictional contact between the conveyor flight and the fabric will maintain the same at the proper discharge tension. The liner from the stock roll 221 will be passed beneath the fixed roller 272 and then over the top of the drive roll 222 and then beneath the threading roll 274 in its threading position 290. From there the stock then passes about the bottom of fixed roller 273 and is then threaded onto the liner roll 223 over the top thereof from the left hand side thereof as seen in FIG. 12.

After the liner is properly secured to the liner roll, the operator may then move the handle 288 to pivot the idler roll 274 to its drive position causing the liner to wrap substantially completely around the rubber covered drive roll 222. The drive 260 is now energized and the fabric F will be discharged onto the conveyor 226 to pass onto the loading conveyor 227 of a tire servicer. Since the loading conveyor 227 will normally function properly to center the fabric with respect to the servicer storage drums, a centering or tracking mechanism need not necessarily be provided with the stand of this embodiment. The liner will then pass around the rolls 272, 222, 274, 273 and onto the liner roll 223.

Again, as in the FIG. 1 embodiment, the diameter of the drive roll 222 will be slightly smaller than the diameters of the stock and liner rolls 221 and 223, respectively, so that the liner will be maintained under the proper tension as it is wound onto the liner roll. The slip clutch unit 255 affords the variation between the rotational speed of the sprocket 244 and the rotational speed of the liner shaft 245. The drag brake 239 will maintain the liner under proper tension as it is payed from the stock roll.

When the tire fabric has been discharged onto the conveyor, the stand may simply be pulled out of its unloading position and trundled back to receive another roll of tire fabric material. It can now be seen that there is provided a tire fabric transfer mechanism which will facilitate the placement of special fabric materials in a fabric handling and storage system and which will serve as a second source for the tire servicers in the event of inoperativeness of any portion of the handling and storage system.

Other modes of applying the principle of the invention may be employed, change being made as regards the details described, provided the features stated in any of the following claims or the equivalent of such be employed.

I, therefore, particularly point out and distinctly claim as my invention:

1. A transfer mechanism for tire fabric and the like comprising a frame, wheel means supporting said frame, vertically extending parallel side plates mounted on said frame, a stock roll including a tire fabric material and liner therefor wrapped thereon journalled between said plates, a drive roll and a liner roll journalled between said plates parallel to said stock roll, means to thread said liner from said stock roll about said drive roll and onto said liner roll, and drive means carried by said frame connected to said drive and line rolls operative to pay said liner from said stock roll onto said liner roll and deliver such fabric from said stock roll.

2. A transfer mechanism as set forth in claim 1 including drag brake means operatively associated with said stock roll to maintain said liner under tension between said stock roll and drive roll.

3. A transfer mechanism as set forth in claim 1 wherein said stock and liner rolls have a larger diameter than said drive roll.

4. A transfer mechanism as set forth in claim 1 including a slip clutch operatively associated with said liner roll operative to maintain said liner under tension between said drive and liner rolls.

5. A transfer mechanism as set forth in claim 1 including a threading roll, means mounting said threading roll for movement to and from drive and threading positions.

6. A transfer mechanism as set forth in claim 1 wherein said drive means includes a drive motor and a speed reducer, and chain drive means connecting said speed reducer to said drive roll and said liner roll.

7. A transfer mechanism as set forth in claim 1 wherein said frame includes upstanding columns, said plates and rolls journalled therebetween being cantilevered on one side of said column, and said drive means being on the opposite side of said columns.

8. A transfer mechanism as set forth in claim 1 including rail means on said frame, said upstanding side plates and the rolls journalled therebetween being mounted on said rail means for movement therealong, and means responsive to the position of the edge of such tire fabric delivered from said stock roll to move said plates and rolls along said rail means.

9. A transfer mechanism as set forth in claim 1 including a power take-off operatively connected to said drive means and adapted to be connected to the mechanism to which such fabric is delivered.

10. A transfer mechanism for tire fabric materials and the like, a stand, wheel means supporting said stand for movement, a stock roll mounted on said stand including a tire fabric material and liner therefor wrapped thereon, a liner roll mounted on said stand, and drive means operative to pull said liner from said stock roll paying such fabric therefrom and wind said liner on said liner roll, said drive means including a liner drive roll about which said liner is wrapped between said stock and liner rolls.

11. A transfer mechanism as set forth in claim 10 including a movable idle roll operative in the drive position thereof to wrap said liner about said drive roll.

12. A transfer mechanism as set forth in claim 11 including operator means to move said idler roll from said drive position to a liner threading position, said operator means including locking means for said idler roll when in said drive position.

13. A transfer mechanism as set forth in claim 12 wherein said locking means includes a toggle linkage between said operator means and said idler roll.

14. A transfer mechanism as set forth in claim 10 wherein said liner roll is slightly larger in diameter than said drive roll, and slip clutch means operatively associated with said liner roll, said drive means being operative to drive directly said drive roll and drive said liner roll through said slip clutch means.

15. A transfer mechanism as set forth in claim 10 including a shelf on said stand over which such fabric travels as it is payed from said stock roll, a photocell unit mounted above said shelf and operative to sense the position of the edge of such fabric, and means responsive to the position of the edge of such fabric axially to shift said stock roll.

16. A transfer mechanism as set forth in claim 10 wherein said stock roll is cantilevered from an upstanding column on said stand, said stand including a low horizontal base portion forming with said cantilevered stock roll a C-shape stand adapted to enclose a tire fabric conveyor and the like with said stock roll being positioned above and adjacent such conveyor.

17. A transfer mechanism as set forth in claim 16 wherein said drive means includes a drive motor and speed reducer mounted on said lower horizontal frame of said stand on the opposite side of said column as said stock roll.

18. A transfer mechanism for tire fabric and the like comprising a frame, wheel means supporting said frame, parallel rail means mounted on said frame, a stand supported on said rail means for movement therealong, said stand including vertically extending parallel side plates, a stock roll including a tire fabric material and liner therefor wrapped thereon journalled between said plates, a drive roll and liner roll journalled between said plates parallel to said stock roll, means to thread said liner from said stock roll about said drive roll and onto said liner roll, drive means connected to said drive and liner rolls operative to pay said liner from said stock roll onto said liner roll while delivering such fabric from said stock roll, and means mounted on said frame operative to sense the edge of such fabric payed from said stock roll and to shift said stand along said rails accordingly.

19. A transfer mechanism as set forth in claim 18 including a shelf on said stand over which such fabric passes as it is delivered from said stock roll, said edge sensing means comprising a photocell unit mounted on said frame above said shelf, and means horizontally to adjust said edge sensing means to accommodate different widths of tire fabric.

20. A transfer mechanism as set forth in claim 19 including a power take-off on said stand connected to said drive means adapted to be connected to a tire servicer and the like, said power take-off means comprising a flexible shaft having miter gear boxes at each end thereof.

21. A transfer mechanism as set forth in claim 20 wherein one of said rails has inclined top edges, and correspondingly inclined rollers on said stand operative to engage said inclined top edges to maintain said stand properly positioned on said rails.

22. A transfer mechanism as set forth in claim 18 wherein said drive means comprises a drive motor and speed reducer mounted on said stand, a jack shaft mounted on said stand driven by said speed reducer, and chain drive means connecting said jack shaft and said drive and liner rolls to rotate the same in the same direction.

23. A transfer mechanism as set forth in claim 22 including a slip clutch operatively associated with said liner roll, said chain drive driving said liner roll through said slip clutch.

24. A transfer mechanism as set forth in claim 23 including drag brake means operatively associated with said stock roll operative to retard rotation thereof.

25. A transfer mechanism as set forth in claim 18 including piston-cylinder means interconnecting said frame and stand operative to move said stand along said rails.

26. A transfer mechanism for tire fabric and the like comprising a frame, wheel means supporting said frame for movement, a vertically extending column on said frame, a stand cantilevered from said column comprising two vertically extending plates, a stock roll including a tire fabric material and liner therefor wrapped thereon journalled between said plates, a drive roll and a liner roll journalled between said plates, said liner being wrapped about said drive roll and threaded on said liner roll, and drive means on said frame on the opposite side of said column from said rolls connected to said drive and liner rolls operative to pay said liner from said stock roll onto said liner roll and deliver such fabric from such stock roll.

27. A transfer mechanism as set forth in claim 26 wherein said drive means comprises a drive motor and a speed reducer, chain drive means interconnecting said speed reducer and said drive roll, a slip clutch operatively associated with said liner roll, and further chain drive means interconnecting said drive roll and said slip clutch operative to drive said liner roll through said slip clutch.

28. A transfer mechanism as set forth in claim 27 including a drag brake operatively associated with said stock roll to retard rotation thereof.

29. A transfer mechanism for tire fabric materials and the like, a stand, wheel means supporting said stand for movement, a stock roll mounted on said stand including a tire fabric material and liner therefor wrapped thereon, a liner roll mounted on said stand, drive means operative to pull said liner from said stock roll paying such fabric therefrom and wind said liner on said liner roll, and synchronizing means operative to synchronize the receiver of such fabric with the speed of said liner to accomplish the transfer thereof at substantially zero tension.

30. A transfer mechanism as set forth in claim 29 wherein such receiver includes a liner, and said synchronizing means drives the liner of such receiver at the same surface speed as the liner of said transfer means.

References Cited by the Examiner

UNITED STATES PATENTS

| | | | |
|---|---|---|---|
| 2,832,396 | 4/1958 | Harris | 156—406 X |
| 3,017,312 | 1/1962 | Kraft | 156—406 X |
| 3,019,153 | 1/1962 | Noall et al. | 156—406 |

EARL M. BERGERT, *Primary Examiner.*

HAROLD ANSHER, *Examiner.*